(12) United States Patent
Dashefsky et al.

(10) Patent No.: US 7,480,629 B2
(45) Date of Patent: Jan. 20, 2009

(54) COMPUTER PROCESS FOR MODELING FLOW OF PATIENTS THROUGH HOSPITAL UNITS

(75) Inventors: Michael S. Dashefsky, Mission Viejo, CA (US); Edward R. Larsen, La Grange, IL (US)

(73) Assignee: GE Medical Systems Information Technologies, Inc., Milwaukee, WI (US)

( * ) Notice: Subject to any disclaimer, the term of this patent is extended or adjusted under 35 U.S.C. 154(b) by 1114 days.

(21) Appl. No.: 09/821,774

(22) Filed: Mar. 29, 2001
(Under 37 CFR 1.47)

(65) Prior Publication Data

US 2002/0107769 A1 Aug. 8, 2002

Related U.S. Application Data

(60) Provisional application No. 60/192,806, filed on Mar. 29, 2000.

(51) Int. Cl.
*G06Q 40/00* (2006.01)

(52) U.S. Cl. .............................. 705/35; 705/38; 705/37; 705/36; 705/26

(58) Field of Classification Search .................... 705/2, 705/38, 29, 28, 400, 35, 34, 37, 36, 26; 364/400, 364/436, 439; 340/910
See application file for complete search history.

(56) References Cited

U.S. PATENT DOCUMENTS 5,065,315 A * 11/1991 Garcia ........................... 705/2

| | | | |
|---|---|---|---|
| 5,502,637 A * | 3/1996 | Beaulieu et al. ............... 705/36 |
| 5,508,912 A * | 4/1996 | Schneiderman ................ 705/3 |
| 5,617,321 A | 4/1997 | Frizelle et al. ........... 364/468.1 |
| 5,732,401 A * | 3/1998 | Conway ........................ 705/29 |
| 5,801,943 A * | 9/1998 | Nasburg ....................... 701/117 |
| 5,944,659 A | 8/1999 | Flach et al. .................. 600/300 |
| 6,021,397 A * | 2/2000 | Jones et al. .................... 705/36 |
| 6,064,986 A * | 5/2000 | Edelman ....................... 705/36 |
| 6,154,731 A | 11/2000 | Monks et al. ................. 705/35 |
| 6,317,719 B1 * | 11/2001 | Schrier et al. .................. 705/2 |

OTHER PUBLICATIONS

Planning a strategic information system for a market-oriented non-profit organization Martinsons, Maris G, Hosley, Suzanne. Journal of Systems Management. Cleveland: Feb. 1993. vol. 44, Iss. 2; pp. 14, 7 pgs.*
Keller, Lou, "A "Suite" Simulation", *Simulation Success*, p. 21 (Dec. 1997).

(Continued)

*Primary Examiner*—Frantzy Poinvil
*Assistant Examiner*—Clement Graham
(74) *Attorney, Agent, or Firm*—Andrus, Sceales, Starke & Sawall, LLP

(57) ABSTRACT

A method of assessing patient flow through a hospital is disclosed. Through the collection of data regarding hospital statistics, a model can be built. Also, an hourly cost can be assigned to each care unit of the hospital for each patient. The model can be used to simulate the flow of patients through the hospital. Additionally, the model can be used to estimate a cost savings that would result from a purchase of patient monitoring equipment, or other resource changes.

20 Claims, 25 Drawing Sheets

OTHER PUBLICATIONS

Lange, Victor, "Blueprints Designed to Improve Quality of Care Using Simulation Tools", *Simulation Success* pp. 31-32 (Apr. 1997).

Lowder, Bonnie, "Durham Regional Saves $150,000 Annually Using Simulation Tools". *Simulation Success* pp. 43-44 (Apr. 1997).

Medmodel, Stimulation Software for the Medical Industry, Brochure.

Pell, Wanda, "Consultant Saves $350,000 on OR Project", *Simulation Success* (Jan. 1998).

The Promodel, Brochure from Medmodel, Orem, Utah.

* cited by examiner

| FIG. 2A | FIG. 2B |
|---|---|

FIG. 2

Clinical Assessment and Hospital Process Evaluation Data Input Form

| | Capacity | | | | Demand | Duration |
|---|---|---|---|---|---|---|
| | No. of Beds | No. of monitored Beds | Number of nurses on staff | Number and type of other specialists | Ave daily census | Average length of stay |
| Total Enterprise | | | | | | |
| Individual Departments | | | | | | |
| ED | | | | | | |
| Admit | | | | | | |
| ICU | | | | | | |
| CICU | | | | | | |
| Med/Surge | | | | | | |
| Cardiac StepDown | | | | | | |

| Patient Flow | | Attributes | | |
|---|---|---|---|---|
| In flow: From departments, % of total patients | Out flow: To departments, % of total patients | Patient Acuity Range | Comments (obvious bottlenecks or key revenue center?) | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

| Input | | | | | | | | | | | | | | |
|---|---|---|---|---|---|---|---|---|---|---|---|---|---|---|
| Unit | Admitting | ED | 2C | 2D | 3D | 5A | 5B | 6D | CICU | CVICU | MICU | Med-Surg | Total |
| Total | | | | | | | | | | | | | |
| Admitting | | | | | | | | | | | | | |
| ED | | | | | | | | | | | | | |
| 2C | | | | | | | | | | | | | |
| 2D | | | | | | | | | | | | | |
| 3D | | | | | | | | | | | | | |
| 5A | | | | | | | | | | | | | |
| 5B | | | | | | | | | | | | | |
| 6D | | | | | | | | | | | | | |
| CICU | | | | | | | | | | | | | |
| CVICU | | | | | | | | | | | | | |
| MICU | | | | | | | | | | | | | |
| Med-Surg | | | | | | | | | | | | | |
| OR | | | | | | | | | | | | | |
| Cath Lab | | | | | | | | | | | | | |
| Other | | | | | | | | | | | | | |

FIG. 3A

| Output | | | | | | | | | | | | | | | | |
|---|---|---|---|---|---|---|---|---|---|---|---|---|---|---|---|---|
| Unit | Discharged | ED | 2C | 2D | 3D | 5A | 5B | 6D | CICU | CVICU | MICU | Med-Surg | Total | | | |
| | | | | | | Output | | | | | | | | | | |
| | | | | | | | | | | | | | | | | |
| Total | | | | | | | | | | | | | | | | |
| Discharged | | | | | | | | | | | | | | | | |
| ED | | | | | | | | | | | | | | | | |
| 2C | | | | | | | | | | | | | | | | |
| 2D | | | | | | | | | | | | | | | | |
| 3D | | | | | | | | | | | | | | | | |
| 5A | | | | | | | | | | | | | | | | |
| 5B | | | | | | | | | | | | | | | | |
| 6D | | | | | | | | | | | | | | | | |
| CICU | | | | | | | | | | | | | | | | |
| CVICU | | | | | | | | | | | | | | | | |
| MICU | | | | | | | | | | | | | | | | |
| Med-Surg | | | | | | | | | | | | | | | | |
| OR | | | | | | | | | | | | | | | | |
| Cath Lab | | | | | | | | | | | | | | | | |
| Other | | | | | | | | | | | | | | | | |

FIG. 3B

Units Overview

| Unit | Beds | Monitors | | | Patients (census) | Occupancy | ALOS | Patient: Nurse Ratio | Hourly Cost | Average Overtime per Day | # of Monitoring Techs | Transports per Day | Primary Diagnoses |
|---|---|---|---|---|---|---|---|---|---|---|---|---|---|
| | | Hardwire | Portable | Telemetry | | | | | | | | | |
| Total | 0 | 0 | 0 | 0 | | | | | | | | | |
| Admitting | | | | | | | | | | | | | |
| ED | | | | | | | | | | | | | |
| 2C | | | | | | | | | | | | | |
| 2D | | | | | | | | | | | | | |
| 3D | | | | | | | | | | | | | |
| 5A | | | | | | | | | | | | | |
| 5B | | | | | | | | | | | | | |
| 6D | | | | | | | | | | | | | |
| CICU | | | | | | | | | | | | | |
| CV/CU | | | | | | | | | | | | | |
| MICU | | | | | | | | | | | | | |
| Med-Surg | | | | | | | | | | | | | |

| Unit | Rooms | Cases | Average Case Time | Staff per Room | Hourly Cost | Average Overtime | Backlog | Primary Diagnoses |
|---|---|---|---|---|---|---|---|---|
| OR | | | | | | | | |
| Cath Lab | | | | | | | | |
| Other | | | | | | | | |

FIG. 3C

Initial Assessment

Hospital Name _____ Phone Number _____
Date _____ Fax Number _____
Contact _____ e-mail _____
                                                Web site _____

What is organization's vision/key issues for next five years?    _____
_____ number of acute care beds                       _____
Avereage daily census                           _____
Occupancy                                       _____
Seasonal or other fluctuations?                 _____

Annual ER Visits                                _____

% of ER Visits Admitted                         _____

Do you have ER  diversions?                     _____
         If yes how often (days per year)       _____

Prolonged wait for beds?    _____

Do you experience patient flow bottlenecks?

ER _____ ICU _____
OR _____ Telemetry Units _____
Cath Lab _____ Other Areas _____
_____

Do you perform internal transfers to provide short term monitoring?

Oncology _____ Surgical _____
Neurology _____ Stroke unit _____
Obstetrics _____ Medical _____
Orthopedics _____ Other _____

Occu    Plans to
                                              Number  pancy   Replace
Existing Monitoring _____ ┌──────┬──────┬──────┐
                                              │      │      │      │
                    Monitored beds            ├──────┼──────┼──────┤
                                              │      │      │      │
                    Telemetry beds            └──────┴──────┴──────┘

RN labor costs per hour                    _____ Direct or burdened? _____

If yes,         Cost per
Do you use monitoring techs?       _____ how many _____ hour _____

Do you have other monitoring related problems? _____
_____

FIG. 3D

Hospital Profile

Hospital Name _____

Number of Acute Care Beds _____

Number of Discharges _____

Number of ED Visits _____

Average Daily Census _____

Inpatient (Facility) Days _____

Average LOS _____

Occupancy _____

Medicare Case-Mix Index _____

% Medicare Patients _____

% Medicare Days _____

% Medicaid Patients _____

% Medicaid Days _____

% ED Visits Admitted _____

% of Admissions from ED _____

Average hourly direct nursing cost _____ Burden Rate_____

Average hourly direct monitoring tech _____

Operating Revenue _____

Total Expenses _____

Operating Income _____

Operating Margin _____

Net Price Per Discharge _____

Net Cost Per Discharge _____

Emergency Room Visit Charge _____

FIG. 3E

Hospital Profile

ER Hourly Cost _____

FTE's Per Bed _____

Emergency Department Diversions _____

Open heart surgery? _____

Trauma Center _____

Top Five DRG's

| Name | DRG# | Avg LOS | Avg Cost |
|------|------|---------|----------|
|  |  |  |  |
|  |  |  |  |
|  |  |  |  |
|  |  |  |  |

Others

|  |  |  |  |
|------|------|---------|----------|
|  |  |  |  |
|  |  |  |  |
|  |  |  |  |
|  |  |  |  |
|  |  |  |  |

Key Benchmark Hospitals

Other Data

Emergency Department diversions
    How many days per year on diversion
    Average visits per year
    Estimated visits lost
    Average ED revenue per visit
Estimated ED revenues lost
    Percent of ED patients admitted
    estimated admissions lost
    Average Net Revenue per Admission
Estimated lost in patient revenue

Unnecessary internal patient transfers
    Total (or per patient admission) Transfers for monitoring only
    Estimated cost per transfer
      Nursing
      Housekeeping
      Transport
      Other
    Estimated reduction with "flex-bed/unit"
  Estimated cost savings eliminating transfers

Costly or unmonitored patient transports
    Total nurse accompanied transports per day
    How many could be eliminated with central transport monitoring
    What is average nursing time per transport?

Monittoring technicians
    Total number currently
    Labor cost per hour

FIG. 3G

Other Data

Estimated Efficiency of ICU/CCU
    Total ICU Beds
    Average Daily ICU Census
    Total ICU Days
    Average ICU LOS
    ICU Days for Monitoring Only (ClassI/II)
    ICU Days waiting discharge
    Average nurse to patient ratio

Estimated Efficiency of IntermediateCare/Step-Down Units
    Total Monitored Beds
      Portable/Hardwired
      Telemetry
    Average Daily Unit Census
    Total Unit Days
    Average Unit LOS
    Average Nurse to patient ratio

Patient flow bottlenecks
    ICU/CCU and Intermediate Care Unit
      Use data above ED
      Average wait for admission/monitored bed
      Peak wait for admission/monitored bed
      How frequently?

Post Surgery
      Average unnecessary wait time to transfer back to unit
      Cancelled cases
      Staff overtime Post Interventional Cath
      Average unnecessary wait time to transfer back to unit
      Cancelled cases
      Staff overtime Other areas with patient flow bottlenecks

FIG. 3H

Patient Monitoring Census Report
Last 8 Hours Activity
Top 10% Recommend Discharge

| Patient Name | Patient ID | Unit | Diagnosis | AGE | Class | Overall LOS | Monitor LOS(Cur.) | AVG. HR. | MIN. HR. |
|---|---|---|---|---|---|---|---|---|---|
| Johnson, Fred | 1335567789 | 4W | ROMI | 72 | II | 4.7 | 2.4 | 88 | 74 |
| Bartell, Mary | 124359671 | 4E | Pneumonia | 67 | II | 5.2 | 3.6 | 110 | 81 |
| Sanchez, Jason | 33478990 | 4W | Cardiac Bypa | 44 | I | 6.3 | 4.2 | 96 | 71 |

| Total Beats | Vert. % | Supra-Vert. % | Paced % | Pairs | Total Runs | Beats In Runs | ST Level |
|---|---|---|---|---|---|---|---|
| 52,381 | 8 | 0 | 0 | 4 | 0 | NA | 1 |
| 64,521 | 1 | 0 | 0 | 0 | 0 | NA | 0 |
| 55,476 | 6 | 0 | 0 | 12 | 0 | NA | 1 |

FIG. 7

Resource Statistics – Hours

| | #Trans | Tot. Wait # | Avg. Wait # | Max. Wait # | Avg. Wait | Avg. NZ Wait | Tot. Wait |
|---|---|---|---|---|---|---|---|
| Bed | 2438 | 0 | | 0 | 0.00 | 0.00 | 0.00 |
| OR | 2413 | 0 | | 0 | 0.00 | 0.00 | 0.00 |
| SICU | 183 | 36 | | 1 | 1.40 | 7.11 | 256.13 |
| NW7 | 602 | 0 | | 0 | 0.00 | 0.00 | 0.00 |
| ED | 1546 | 0 | | 0 | 0.00 | 0.00 | 0.00 |
| MICU | 205 | 1 | | 1 | <0.01 | 0.28 | 0.26 |
| CSICU | 287 | 164 | 2 | 4 | 4.61 | 8.06 | 1322.62 |
| CMICU | 90 | 0 | | 0 | 0.00 | 0.00 | 0.00 |
| Burn | 34 | 0 | | 0 | 0.00 | 0.00 | 0.00 |
| Trauma | 141 | 0 | | 0 | 0.00 | 0.00 | 0.00 |
| Neuro | 131 | 7 | | 1 | 0.42 | 7.94 | 55.60 |
| WW4 | 1020 | 203 | 2 | 6 | 0.78 | 3.90 | 791.39 |
| IMC | 355 | 6 | 2 | 3 | 0.08 | 4.94 | 29.66 |
| NW8 | 990 | 191 | 2 | 5 | 0.43 | 2.23 | 425.82 |
| NW9 | 903 | 7 | 1 | 2 | 0.02 | 2.46 | 17.20 |
| Rental | 301 | 0 | | 0 | 0.00 | 0.00 | 0.00 |
| Cath | 450 | 0 | | 0 | 0.00 | 0.00 | 0.00 |
| Worker | | | | | | | |

*FIG. 8A*

Total Transactions that Waited at Resource Queue

| | |
|---|---|
| Bed | 0 |
| OR | 0 |
| SICU | 36 |
| NW7 | 0 |
| ED | 0 |
| MICU | 1 |
| CSICU | 164 |
| CMICU | 0 |
| Burn | 0 |
| Trauma | 0 |
| Neuro | 7 |
| WW4 | 203 |
| IMC | 6 |
| NW8 | 191 |
| NW9 | 7 |
| Rental | 0 |
| Cath | 0 |
| Worker | |

Resource Statistics Worker

| | #Trans | Tot. Wait | Avg. Wait | # | Max. Wait | # | Avg. Wait | Avg. NZ Wait | Tot. Wait |
|---|---|---|---|---|---|---|---|---|---|
| Admitting | | | | | | | | | |
| Care Units | | | | | | | | | |
| Discharge | | | | | | | | | |
| ED | | | | | | | | | |
| ICU | | | | | | | | | |
| OR | | | | | | | | | |
| Telemetry | | | | | | | | | |

FIG. 8B

|  | #Trans | Max Cap Used | Tot #Wait | Avg #Wait | Max #Wait |
|---|---|---|---|---|---|
| Discharge — Home | 6104 | 1 | 0 | 0 | 0 |
| Admitting — Start | 5964 | 1 | 0 | 0 | 0 |
| OR — Surgery | 2412 | 12 | 0 | 0 | 0 |
| Care Units — Med-Surg | 2334 | 130 | 0 | 0 | 0 |
| ED — ED | 1545 | 8 | 0 | 0 | 0 |
| Telemetry — WW4 Cardia | 1000 | 29 | 203 | 2 | 6 |
| Telemetry — NW8 | 955 | 43 | 191 | 2 | 5 |
| Telemetry — NW9 | 872 | 40 | 7 | 1 | 2 |
| Telemetry — NW7 | 576 | 33 | 0 | 0 | 0 |
| OR — Cath Lab | 450 | 2 | 0 | 0 | 0 |
| Telemetry — IMC | 339 | 23 | 6 | 2 | 3 |
| Telemetry — 3 Rental | 286 | 21 | 0 | 0 | 0 |
| ICU — CSICU | 279 | 12 | 164 | 2 | 4 |
| ICU — MICU | 197 | 13 | 1 | 1 | 1 |
| ICU — SICU | 174 | 10 | 36 | 1 | 2 |
| ICU — Trauma ICU | 133 | 12 | 0 | 0 | 0 |
| ICU — Neuro ICU | 126 | 9 | 7 | 1 | 1 |
| ICU — CMICU | 87 | 5 | 0 | 0 | 0 |
| ICU — Burn ICU | 31 | 5 | 0 | 0 | 0 |

| Tot #Res Wait | Tot #Block | Tot Res Wait | Tot Block | Tot Inact | Avg. Res Wait | Avg. Block | Avg. Inact |
|---|---|---|---|---|---|---|---|
| 0 | 0 | 0.00 | 0.00 | 0.00 | 0.00 | 0.00 | 0.00 |
| 0 | 0 | 0.00 | 0.00 | 0.00 | 0.00 | 0.00 | 0.00 |
| 0 | 0 | 0.00 | 0.00 | 0.00 | 0.00 | 0.00 | 0.00 |
| 0 | 0 | 0.00 | 0.00 | 0.00 | 0.00 | 0.00 | 0.00 |
| 0 | 0 | 0.00 | 0.00 | 0.00 | 0.00 | 0.00 | 0.00 |
| 203 | 0 | 31.46 | 0.00 | 0.00 | 0.03 | 0.00 | 0.00 |
| 191 | 0 | 17.73 | 0.00 | 0.00 | 0.02 | 0.00 | 0.00 |
| 7 | 0 | 0.72 | 0.00 | 0.00 | <0.01 | 0.00 | 0.00 |
| 0 | 0 | 0.00 | 0.00 | 0.00 | 0.00 | 0.00 | 0.00 |
| 0 | 0 | 0.00 | 0.00 | 0.00 | 0.00 | 0.00 | 0.00 |
| 6 | 0 | 1.23 | 0.00 | 0.00 | <0.01 | 0.00 | 0.00 |
| 0 | 0 | 0.00 | 0.00 | 0.00 | 0.00 | 0.00 | 0.00 |
| 164 | 0 | 53.75 | 0.00 | 0.00 | 0.19 | 0.00 | 0.00 |
| 1 | 0 | 0.01 | 0.00 | 0.00 | <0.01 | 0.00 | 0.00 |
| 36 | 0 | 9.58 | 0.00 | 0.00 | 0.06 | 0.00 | 0.00 |
| 0 | 0 | 0.00 | 0.00 | 0.00 | 0.00 | 0.00 | 0.00 |
| 7 | 0 | 2.32 | 0.00 | 0.00 | 0.02 | 0.00 | 0.00 |
| 0 | 0 | 0.00 | 0.00 | 0.00 | 0.00 | 0.00 | 0.00 |
| 0 | 0 | 0.00 | 0.00 | 0.00 | 0.00 | 0.00 | 0.00 |

FIG. 8C

Transaction Statistics

| #Trans | Avg Cost | Avg VA Cost | Avg BVA Cost | Avg NVA Cost | Avg Lbr Cost | Avg Eq Cost | Avg Oth Cost | Avg OT Cost |
|---|---|---|---|---|---|---|---|---|
| 21669 | $3060.79 | $3060.79 | $0.00 | $0.00 | $0.00 | $0.00 | $3060.79 | $0.00 |

Activity Statistics

| | Tot Cost | Tot VA Cost | Tot BVA Cost | Tot NVA Cost | Tot Lbr Cost | Tot Eq Cost | Tot Oth Cost | Tot OT Cost |
|---|---|---|---|---|---|---|---|---|
| Admitting | $0.00 | $0.00 | $0.00 | $0.00 | $0.00 | $0.00 | $0.00 | $0.00 |
| Care Units | $34276032.83 | $34276032.83 | $0.00 | $0.00 | $0.00 | $0.00 | $34276032.83 | $0.00 |
| Discharge | $0.00 | $0.00 | $0.00 | $0.00 | $0.00 | $0.00 | $0.00 | $0.00 |
| ED | $690600.02 | $690600.02 | $0.00 | $0.00 | $0.00 | $0.00 | $690600.02 | $0.00 |
| ICU | $18792000.46 | $18792000.46 | $0.00 | $0.00 | $0.00 | $0.00 | $18792000.46 | $0.00 |
| OR | $2753400.07 | $2753400.07 | $0.00 | $0.00 | $0.00 | $0.00 | $2753400.07 | $0.00 |
| Telemetry | $10962000.27 | $10962000.27 | $0.00 | $0.00 | $0.00 | $0.00 | $10962000.27 | $0.00 |

FIG. 9A

Activity Statistics

| | Tot Cost | Tot VA Cost | Tot BVA Cost | Tot NVA Cost | Tot Lbr Cost | Tot Eq Cost |
|---|---|---|---|---|---|---|
| Care Units – Med–Surg | $34276032.83 | $34276032.83 | | $0.00 | $0.00 | $0.00 |
| ICU – ICU | $18792000.46 | $18792000.46 | | $0.00 | $0.00 | $0.00 |
| Telemetry – Telemetry | $10962000.27 | $10962000.27 | | $0.00 | $0.00 | $0.00 |
| OR – Surgery | $2753400.07 | $2753400.07 | | $0.00 | $0.00 | $0.00 |
| ED – ED | $690600.02 | $690600.02 | | $0.00 | $0.00 | $0.00 |
| Admitting – VitalCom Confidential and Proprietary | | | | | | |
| Discharge – Home | | $0.00 | | $0.00 | $0.00 | $0.00 |
| Admitting – Start | | $0.00 | | $0.00 | $0.00 | $0.00 |

| Tot Oth Cost | Tot OT Cost | #Trans | Avg Cost | Avg VA Cost | Avg BVA Cost | Avg NVA Cost | Avg Lbr Cost | Avg Eq Cost | Avg Oth Cost | Avg OT Cost |
|---|---|---|---|---|---|---|---|---|---|---|
| $34276032.83 | $0.00 | 8501 | $4032.00 | $4032.00 | $0.00 | $0.00 | $0.00 | $0.00 | $4032.00 | $0.00 |
| $18792000.46 | $0.00 | 2610 | $7200.00 | $7200.00 | $0.00 | $0.00 | $0.00 | $0.00 | $7200.00 | $0.00 |
| $10962000.27 | $0.00 | 2610 | $4200.00 | $4200.00 | $0.00 | $0.00 | $0.00 | $0.00 | $4200.00 | $0.00 |
| $2753400.07 | $0.00 | 4589 | $600.00 | $600.00 | $0.00 | $0.00 | $0.00 | $0.00 | $600.00 | $0.00 |
| $690600.02 | $0.00 | 3453 | $200.00 | $200.00 | $0.00 | $0.00 | $0.00 | $0.00 | $200.00 | $0.00 |
| | | | | | | | | | | |
| $0.00 | $0.00 | 9806 | $0.00 | $0.00 | | $0.00 | $0.00 | $0.00 | $0.00 | $0.00 |
| $0.00 | $0.00 | 8641 | $0.00 | $0.00 | | $0.00 | $0.00 | $0.00 | $0.00 | $0.00 |

FIG. 9B

Resource Statistics

| | Tot Cost | Tot OT Cost | Tot Busy Cost | Tot Use Cost | Count | Avg Cost | Avg OT Cost | Avg Use Cost |
|---|---|---|---|---|---|---|---|---|
| Worker | $0.00 | | $0.00 | $0.00 | 1 | $0.00 | $0.00 | $0.00 |
| Bed | $45360001.10 | $0.00 | $35080574.35 | $0.00 | 500 | $90720.00 | $0.00 | $0.00 |
| OR | $8640000.21 | $0.00 | $27554000.07 | $0.00 | 20 | $432000.01 | $0.00 | $0.00 |
| ICU | $20736000.50 | $0.00 | $19005000.46 | $0.00 | 64 | $324000.01 | $0.00 | $0.00 |
| Telemetry | $12096000.29 | $0.00 | $11086250.27 | $0.00 | 64 | $189000.00 | $0.00 | $0.00 |
| ED | $7776000.19 | $0.00 | $690925.02 | $0.00 | 36 | $216000.01 | $0.00 | $0.00 |

FIG. 9C

Resource Utilization %

| Worker | 0.00 |
|---|---|
| Bed | 77.34 |
| OR | 31.89 |
| ICU | 91.65 |
| Telemetry | 91.65 |
| ED | 8.89 |

Resource Statistics – Days

| | Count | Avg Busy | Avg OOS | Avg Idle | Avg Res Wait | Avg OT |
|---|---|---|---|---|---|---|
| Worker | 1 | 0.00 | 0.00 | 90.00 | 0.00 | 0.00 |
| Bed | 500 | 69.60 | 0.00 | 20.40 | 0.00 | 0.00 |
| OR | 20 | 28.70 | 0.00 | 61.30 | 0.00 | 0.00 |
| ICU | 64 | 82.49 | 0.00 | 7.51 | 0.00 | 0.00 |
| Telemetry | 64 | 82.49 | 0.00 | 7.51 | 0.00 | 0.00 |
| ED | 36 | 8.0 | 0.00 | 82.00 | 0.00 | 0.00 |

Resource Statistics – Days
Worker

| | Count | Avg Busy | Avg OOS | Avg Idle | Avg Res Wait | Avg OT |
|---|---|---|---|---|---|---|
| Admitting | 1 | 0.00 | 0.00 | 90.00 | 0.00 | 0.00 |
| Care Units | 0 | 0.00 | 0.00 | 0.00 | 0.00 | 0.00 |
| Discharge | 0 | 0.00 | 0.00 | 0.00 | 0.00 | 0.00 |
| ED | 0 | 0.00 | 0.00 | 0.00 | 0.00 | 0.00 |
| ICU | 0 | 0.00 | 0.00 | 0.00 | 0.00 | 0.00 |
| OR | 0 | 0.00 | 0.00 | 0.00 | 0.00 | 0.00 |
| Telemetry | 0 | 0.00 | 0.00 | 0.00 | 0.00 | 0.00 |

FIG. 10A

Activity Statistics

| | Tot Cost | Tot Lbr Cost | Tot Eq Cost | Tot Oth Cost | Tot OT Cost |
|---|---|---|---|---|---|
| Care Units – Med–Surg | $34276032.83 | $0.00 | $0.00 | $34276032.83 | $0.00 |
| ICU – ICU | $18792000.46 | $0.00 | $0.00 | $18792000.46 | $0.00 |
| Telemetry – Telemetry | $10962000.27 | $0.00 | $0.00 | $10962000.27 | $0.00 |
| OR – Surgery | $2753400.07 | $0.00 | $0.00 | $2753400.07 | $0.00 |
| ED – ED | $690600.02 | $0.00 | $0.00 | $690600.02 | |
| Admitting – Vitalcom Confidential and Proprietary | | | | | |
| Discharge – Home | $0.00 | $0.00 | $0.00 | $0.00 | $0.00 |
| Admitting – Start | $0.00 | $0.00 | $0.00 | $0.00 | $0.00 |

FIG. 10B

| Benchmarking | Client | Peer #1 | Peer #2 | Peer #2 | Peer Average* | National Average* | Variance to peers | Variance to National |
|---|---|---|---|---|---|---|---|---|
| Acute care beds | 1 | 1 | 2 | 5 | 2.666667 | 375 | -63% | -100% |
| ALOS | 1 | | | | | 4.9 | -100% | -79% |
| Occupancy | 1 | | | | | 61.4% | | 63% |
| Case Mix Index | 0 | | | | | 1.5651 | | -100% |
| Operating Margin | 1 | | | | | 4.4% | | 2173% |
| Cost Per discharge | 0 | | | | | | | |
| ED Visits | 23 | | | | | | | |
| % Outpatient $ | | | | | | 29.4% | | -100% |
| FTE Bed | 23 | | | | | | | |
| Top Five DRG's | | | | | | | | |
| ALOS | 23 | | | | | | | |
| Averasge Cost | 23 | | | | | | | |
| | 56 | | | | | | | |
| ALOS | 6 | | | | | | | |
| Average Cost | 7 | | | | | | | |
| | 1 | | | | | | | |
| | 3 | | | | | | | |
| ALOS | 2 | | | | | | | |
| Average Cost | 0 | | | | | | | |
| | 9 | | | | | | | |
| ALOS | 4 | | | | | | | |
| Average Cost | 5 | | | | | | | |
| | 6 | | | | | | | |
| ALOS | 7 | | | | | | | |
| Average Cost | 8 | | | | | | | |
| Composite | | | | | | | | |
| ALOS | 8.6 | | | | | | | |
| Average Cost | 14 | | | | | | | |

* All hospitals with 250 beds or more

| | | Emergency 34.0% | Surgery/C 24.0% | Med-Surg 24.0% | ICU 10.0% | TM 8.0% |
|---|---|---|---|---|---|---|
| Patients Start | 3600 | | | | | |
| ALOS | | 0.083333 | 0.125 | 4 | 3.25 | 3.75 |
| Patients | | 3600 | 864 | 864 | 360 | 288 |
| Patients per day | | 40.0 | 9.6 | 9.6 | 4.0 | 3.2 |
| Total Days | | 5706 | 108 | 3456 | 1170 | 1080 |
| From Emergency | | | 0.25 | 0.3 | 0.15 | 0.3 |
| Patients | 856.8 | | 306 | | 183.6 | 367.2 |
| Total Days | 2011.95 | | 38.25 | | 596.7 | 1377 |
| From Surgery | | | | 0.3 | 0.3 | 0.4 |
| Patients | 1170 | | | 351 | 351 | 468 |
| Total Days | 4299.75 | | | 1404 | 1140.75 | 1755 |
| From ICU | | | | 0.2 | | 0.8 |
| Patients | 894.6 | | | 178.92 | | 715.68 |
| Total Days | 3399.48 | | | 715.68 | | 2683.8 |
| From TM | | | | 0.2 | | |
| Patients | 1781.28 | | | 310.176 | | |
| Total Days | 1240.704 | | | 1240.704 | | |
| From Med-Surg | | | | | | |
| Patients | 1704.096 | | | | | |
| Total Days | | | | 1704.096 | | |
| Total Patients | 6831.576 | 1224 | 1170 | 1704.096 | 894.6 | 1838.88 |
| Total Patient Da | 16657.884 | | | | | |
| ALOS | 5.2462472 | | | | | |
| Transfer/Patient | 2.151542 | | | | | |
| Without Surg/ED | 1.3975737 | | | | | |
| Percent still in hospital at 90 days | 0.0582916 | | | | | |
| Patients | 185.0876 | | | | | |

COMPUTER PROCESS FOR MODELING FLOW OF PATIENTS THROUGH HOSPITAL UNITS

REFERENCE TO RELATED APPLICATION

This application claims the priority benefit under 35 U.S.C. § 119(e) from provisional Application No. 60/192,806 of Edward R. Larsen and Michael S. Dashefsky, filed Mar. 29, 2000.

BACKGROUND OF THE INVENTION

1. Field of the Invention

The present invention relates to the modeling of a hospital; more specifically, the invention relates to modeling the flow of patients through hospital units.

2. Description of the Related Art

Care of patients in a hospital is of great concern to all—doctors, nurses, patient care staff, the patient and the patient's family as well as hospital administrators. Increased care can lead to increased chances for better recovery for the patient. However, there are limits on the care a hospital can provide to a patient, given given its resources: availability of care providers, availability of equipment, availability of beds, etc.

Among these concerns is the efficient moving of patients through the various hospital units. Often a patient is moved from one care unit to another care unit depending upon the condition of the patient and the care required. Sometimes, however, the care unit the patient is to be moved to is full and so that the patient cannot be moved and subsequently cannot receive the exact healthcare required. Conversely, sometimes patients must be moved from an optimal care unit to have access to special monitors located in another care unit. Such delays or unnecessary stays in inappropriate care areas may delay recovery and discharge and lead to unnecessary costs and suboptimal care. These problems are complicated by the limitations, including, but not limited to, of numbers of beds, number of monitored beds, staff and equipment in a hospital.

SUMMARY OF THE INVENTION

In accordance with one embodiment of the present invention, a method of modeling patient flow through a hospital is disclosed. Data regarding hospital statistics (such as length of stay, etc.) is collected. An hourly cost is assigned to each care unit for each patient. Based upon the collected data, a model is built. The model can simulate flow of patents through the hospital.

In accordance with another embodiment of the present invention, a method of determining and/or predicting bottlenecks in a hospital is disclosed.

In accordance with a third embodiment of the present invention, a method of recommending hospital resource changes (such as patient monitoring equipment) to improve patient flow through a hospital is disclosed.

In accordance with a fourth embodiment of the present invention, a method of collecting hospital information utilization based upon real-time patient and hospital information is disclosed.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

These and other features and advantages of the invention will now be described with reference to the drawings of certain preferred embodiments, which are intended to illustrate and not to limit the invention, and in which:

FIG. 2A and 2B depict a clinical assessment and hospital process evaluation data input form.

FIGS. 3A-H are data collection charts used to determine hospital statistics in accordance with an embodiment of the present invention.

FIG. 7 is a patient monitoring census report.

FIG. 8A-C are cost analysis charts produced by the patient flow modeling program in accordance with an embodiment of the present invention.

FIG. 9A-C are resource utilization charts produced by the patient flow modeling program in accordance with an embodiment of the present invention.

FIG. 10A-B are resource statistic charts produced by the patient flow modeling program in accordance with an embodiment of the present invention.

FIGS. 11 and 12 are EXCEL spreadsheet snap-shots used in modeling patient flow in accordance with an embodiment of the present invention.

DETAILED DESCRIPTION OF THE PREFERRED EMBODIMENT

The system and method will now be described with reference to the drawings. These details are set forth in order to illustrate, and not to limit, the invention. The scope of the invention is defined only by the appended claims.

Figure 1:
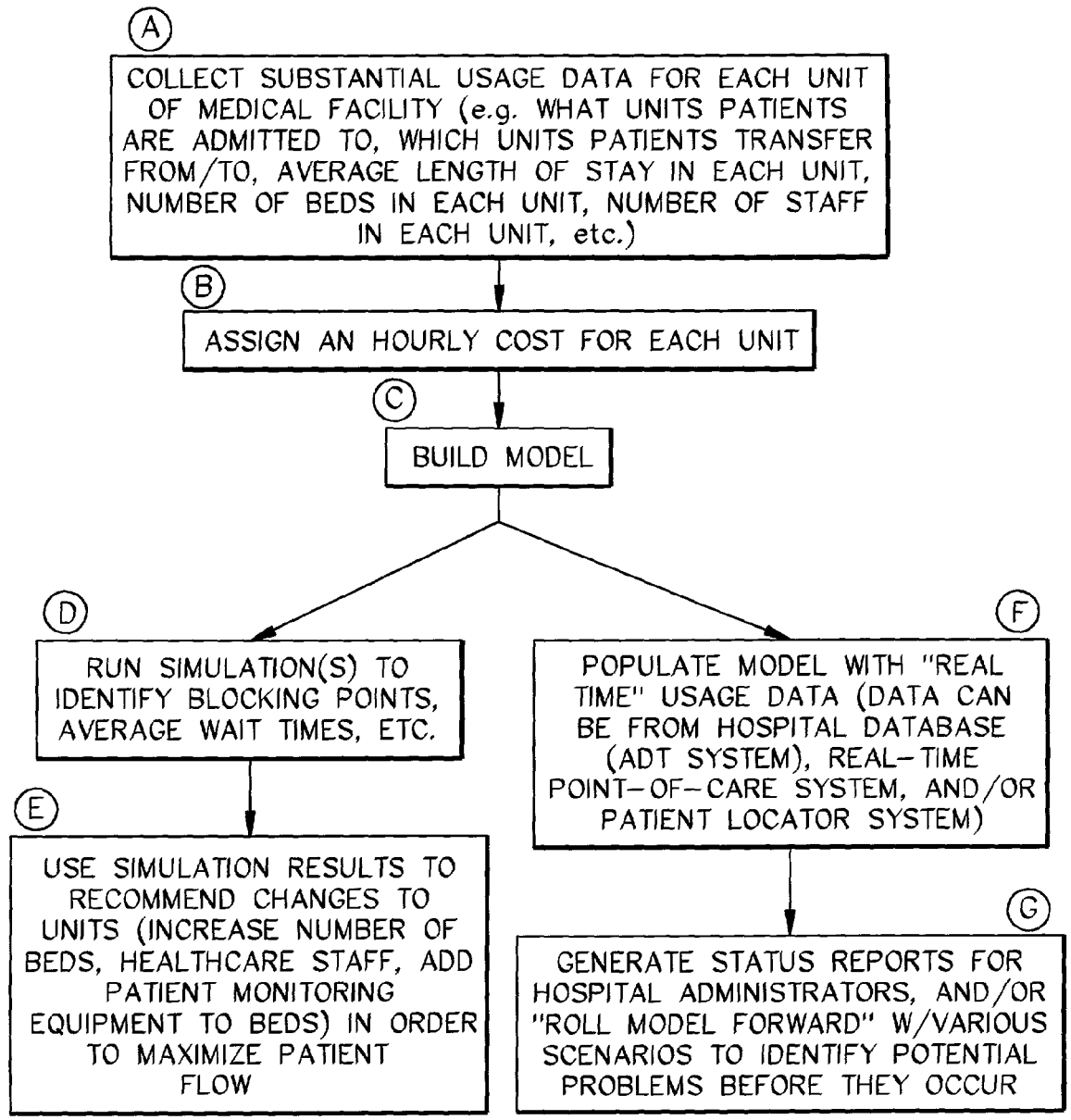
FIG. 1 is a flow chart of the modeling of patient flow in accordance with an embodiment of the present invention.

FIG. 1 is a flow chart illustrating the general methods that are in accordance with various preferred embodiments of the present invention, including, but not limited to, modeling the patient flow through a hospital, predicting bottlenecks in patient flow through a hospital, and generating cost/resource analysis figures for a hospital.

The modeling of patient flow can be done by a hospital to evaluate its performance or by a seller of patient monitoring equipment in order to show the cost savings such equipment could realize. Thus, the steps in FIG. 1 are preferably done by a business entity that provides services to hospitals, or by a business entity that sells a monitoring system product that allows hospitals to move patients from care unit to care unit.

The first step in the method, step A, is to collect data from the hospital. The data shall cover each and every unit in the hospital, including but not limited to: admitting, the Emergency Department (ED), Intensive Care Unit (ICU), Intermediate Care or Step-down Units, the Catherization Lab, the Operating Rooms (OR), and post surgical recovery units, the cardiac unit, the Renal care unit, the Cardiovascular ICU, the Cardiac ICU, the Medical ICU, the Heart Center/EKG/Vascular Lab, other special care units, Surgery, telemetry, general med-surgical units, and discharge. Depending on the hospital, there may be more or less care units and/or these care units may be given different names.

The data to be collected from each unit includes statistics and other factual information about the hospital. The data (statistics) can include, but is not limited to, inventory of beds, inventory of monitored beds, average occupancy (during a day, week, month), average patient length of stay, number of nurses, number and type of monitoring equipment available, average nurse-to-patient ratios, number of other healthcare specialists, the patient acuity range, the number of patient transports to and from the unit, the care unit admission sources from which patients come (and how often), admissions and the care unit or other location to which patients are transferred/discharged (and how often). Next, data regarding the hospital on a macro level is collected. This information can include, but is not limited to, average number and source of admittance admissions, frequency of admittance, the average number of discharges, frequency of discharge, average overall stay in hospital, average number of ED visits with percentage admitted, average occupancy and overall length of stay (LOS), and average cost per admission.

A preferred chart used to gather data about the clinical assessment and hospital process evaluation is shown in FIGS. 2A-B. Additionally, FIGS. 3A-I show various initial assessment forms that can also be used to gather information regarding other hospital statistics and information. These forms can be created in Microsoft® Excel™ and appropriately linked together in a spreadsheet and form part of a model for patient flow, as will be described below.

The various data can be collected by interviewing hospital staff and/or by extracting information from hospital records or databases. The information collected may reflect data from one day or longer, but preferably 90 days to ensure the data accurately reflects the operation of the hospital. In some cases, where hospitals experience significant seasonal variations in census, it is necessary to collect admissions and other data over a longer period and model different time periods. Additionally, the information can be collected automatically by a computer program as described in fuller detail below.

Once step A is completed, an hourly cost is assigned for each unit per patient in step B. This number can be generated by a variety of methods. The cost assigned can depend on a variety of resources, including but not limited to doctor time, nurse time, staffing, drugs, IVs, and other equipment costs. Such assignments of costs are well known in the art. Such cost data can be extracted from Medicare data, for example by data mining and benchmarking companies such as Solucient and Ingenix. For instance, Solucient is an Internet-based tool that provides the strategic performance information hospitals and health systems may need. SoleSource.net delivers analysis of hospital and physician performance based on a wealth of clinical and financial indicators, and saves time by calculating the variance to external benchmark comparisons. Alternatively, many hospitals have internal cost accounting systems that provide average cost per day by different care units.

Next, in step C, a model is built in accordance with this information. The model is preferably generated by a specialist but could alternatively be generated automatically using a model generation program. The modeling can be achieved with a variety of modeling programs that are well known in the art. Examples are AZTEC, Visual Basic, Optima by Micrografx, Inc., or Igraphics, Inc. Modeling and simulations have been previously discussed in U.S. Pat. No. 5,617,321 to Frizelle, et al. and U.S. Pat. No. 6,154,731 Monks et al., both of which are incorporated herein by reference.

In one embodiment of the present invention for step B, one first builds a multi-level model of the key hospital care units. These include as a minimum the ED, OR and interventional cath labs, intensive care units, intermediated care units and general medical surgical units. Each of the levels may be expanded to include more specialized units. For example, the intensive care unit could have a medical ICU, a surgical ICU and coronary care unit. Each unit is then described in terms of numbers of monitored beds and other resources and average length of stay (LOS). Beginning at the admission source point, one assigns the percentage of patients that go to each care unit. Each care unit, in turn, is further described by the percentage of patients going to other care units. The end point is discharge. Finally one begins the simulation at the admission start point by describing the number of patients to be admitted per unit time and the length of time to run the model. The model then will generate patient flow according to each unit in a path and that unit's assigned characteristics.

In one embodiment of the present invention, and referring to FIG. 1, a computer, or any microprocessor or processor can be utilized to perform the steps. Such devices may permits access to the Internet or an Intranet, and include terminal devices, such as personal computers, workstations, servers, clients, mini computers, main-frame computers, laptop computers, a network of individual computers, mobile computers, palm-top computers, hand-held computers, set top boxes for a TV, interactive televisions, interactive kiosks, personal digital assistants, interactive wireless communications devices, mobile browsers, or a combination thereof. The computer may further possess input devices such as a keyboard, mouse, touchpad, joystick, pen-input-pad, and output devices such as a computer screen and a speaker.

These computers may be uni-processor or multi-processor machines. Additionally, these computers include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such a network interface card, a modem, or other network connection device suitable for connecting to the communication medium. Furthermore, the computers execute an appropriate operating system such as Linux, Unix, Microsoft® Windows® 95, Microsoft® Windows® 98, Microsoft® Windows® NT, Apple® MacOS®, or IBM® OS/2®. As is conventional, the appropriate operating system includes a communications protocol implementation which handles all incoming and outgoing message traffic passed over any communications lines. In other embodiments, while the operating system may differ depending on the type of computer, the operating system will continue to provide the appropriate communications protocols necessary to establish communication links with any monitoring devices or other hospital computers.

The computers may advantageously contain program logic, or other substrate configuration representing data and instructions, which cause the computer to operate in a specific and predefined manner as described herein. In one embodiment, the program logic may advantageously be implemented as one or more object frameworks. These modules may advantageously be configured to reside on the addressable storage medium and configured to execute on one or more processors. The modules include, but are not limited to, software or hardware components which perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The depicted steps in FIG. 1 and in later figures may be implemented in modules and those modules may advantageously communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may advantageously be implemented to execute on one or more computers. In another embodiment, some of the components, modules, and databases may be implemented to execute on one or more computers, internal or external to the hospital.

As a sub-step, the information can be put into a spread sheet program, such as Microsoft® Excel™, and a model created therein. This sub-step is useful to check the overall results of the model compared to actual parameters. For example the sub-step allows one to verify that the general model will yield a realistic occupancy rate and length of stay. This is easier to analyze and debug than working with the complex simulation model itself. FIGS. 11 and 12 are EXCEL spreadsheet snapshots used in modeling patient flow.

Figure 4:
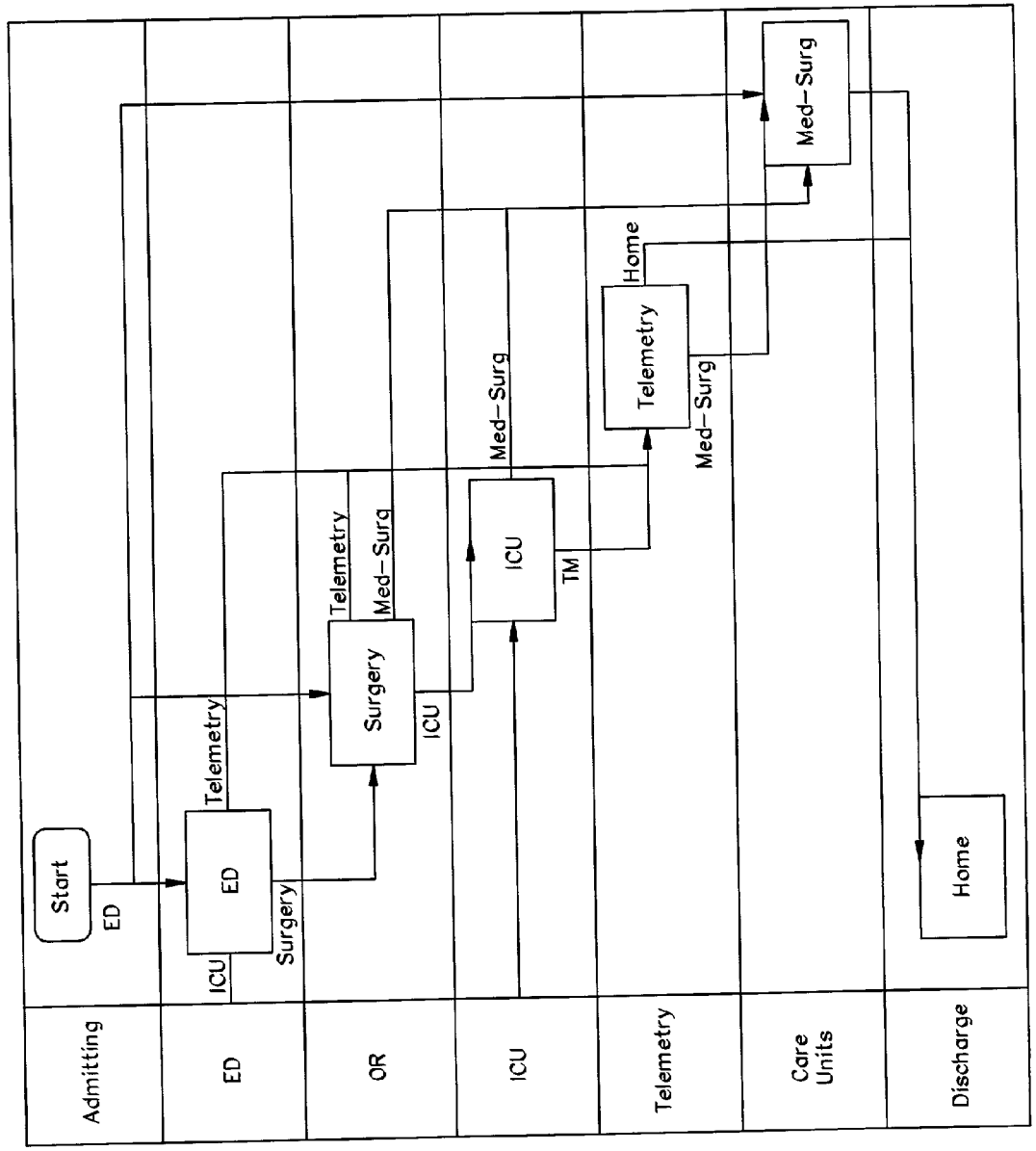
FIG. 4 is a simple hospital care unit flow chart.

For example, a basic map of flow of patients through a hospital is illustrated in FIG. 4. Each care unit is illustrated as a block and lines connect each block to indicate the possible movement of patients from one care unit to another care unit. Each care unit or block is assigned the characteristics determined by the data previously collected. Additionally, the hospital, as a layer on top of the care unit layer, is assigned its characteristics as determined by the data previously collected. For instance, each unit is assigned an average patient length of stay, number of beds, number of healthcare staff, etc. Once the model has been built, it has enough information to reflect the rules of operation that determine how patients move through a hospital. Given this information, the model can predict future movements of a patient. Moreover, the model can determine the effect of a new patient admitted to the hospital. The model can also identify or predict bottlenecks in patient flow. Additionally, the model can show the financial impact of bottleneck and near bottleneck situations. This is accomplished by calculating the cost to the hospital or individual by keeping people in one care unit, when they should be transferred to another care unit, which may be able to tend to additional patients, due to issues of capacity or staff.

After the model is built, there are at least two possible simulations that can be run: (1) hypothetical simulation of the hospital and (2) real-time analysis. These two paths are illustrated in FIG. 1 by steps D and F, respectfully. In each simulation, predictions of bottlenecks are possible.

As indicated in step D, a simulation can be run, based upon the average hospital data, including but not limited to, the number of hospital admissions, where they are admitted to, to determine the effect of new admittees to a hospital. The initial settings for the model can either be: no patients in the hospital at all or any number of patients in any care unit. Then the simulation can be run. The user can either choose the number of patients and the care units they are assigned to patients, or the model can determine this. As more patients enter into the model and the model proliferates. The model will update hospital admissions, discharges, and transfers between care units. Over time and depending upon the characteristics of the hospital, the model can predict where bottlenecks will occur. A bottleneck is preferably defined as a situation where a care unit is full to capacity and other patients seek transfer to that care unit. Thus, the model will illustrate where the bottlenecks are and the updated average wait times patients have to endure before moving to another care unit. When a bottleneck situation occurs, a healthcare providers seek to know who can be moved and where and usually based, in part, on efficiency. This decision can be based upon the health status of the patient, the general care ward, lab results, and other metrics—all of which can be implemented into an expert system and implemented into the modeling program. However, if patients need to be in a certain care unit and cannot be moved or transferred, other patients cannot come into that care unit. Nonetheless, if a patient's bed, in one care unit, has equipment that allows for the communication of patient information to the nursing or other healthcare staff of another care unit, then the same supervision of patient information is capable no matter where the patient physically resides. Thus, care units are not locked into any brand of monitoring equipment since all equipment could, with appropriate systems (like PatientNet™, OpenNet®, and Sitelink®, all by Vitalcom, Inc.), communicate with all care units' patient information monitoring stations.

The PatientNet™ system is an open, real-time communication network that gives caregivers instant access to vital patient information. PatientNet's™ advanced wireless infrastructure brings patients online and sends time-critical patient information to a "Mission Control"-like technology center in your hospital. There, certified technicians watch monitors 24/7, providing consistent monitoring quality to patients across the enterprise. Technicians instantly notify caregivers via an integrated paging system if a critical event occurs. Patient information is also simultaneously available to caregivers at viewing stations throughout the healthcare system. With the PatientNet™ wireless infrastructure: (1) any bed can become a monitored bed; (2) all patients receive the same quality of monitoring care; (3) patient flow bottlenecks can be eliminated; (4) transfers are substantially reduced; and (5) efficiency is increased across the enterprise.

OpenNet® is the core wireless technology that makes the PatientNet™ system open and unique. Traditional monitoring networks are closed—requiring hospitals to purchase monitor devices from one manufacturer in order to display the information on their network. OpenNet® technology enables other manufacturers' medical devices to be integrated into the PatientNet™ system, helping to leverage existing investments in capital equipment and making all monitored information available on a single system, which creates patient care efficiencies.

SiteLink® expands the reach of a tertiary center's real-time monitoring services to other facilities within the organization, to affiliate healthcare facilities across town, even to remote facilities hundreds of miles away. SiteLink® can enhance operational processes, support a consistent standard of care and enable enterprise-wide cost savings.

SiteLink® enables patients at remote or affiliate organizations to be monitored by a "Mission Control"-like technology center located at the tertiary facility. SiteLink® uses wide area network technology: patient waveforms and other vital signs are transmitted in real time to PatientNet™ Mission Control. Simultaneously, the data is available for review by caregivers throughout the enterprise, including at the remote or affiliate site.

Additionally, as in step F of FIG. 1, the model, or a human operator of the model, can suggest what types of additional resources are needed in the hospital and where those resources should be located. This prediction can be based upon the identification of bottlenecks or near bottleneck situations or inadequate resource utilization or cost analysis. Once the changes are made and the model rebuilt, the simulation can be re-run. The updated model can illustrate how effective the changes are and if any other changes are needed. A side by side display of both simulations can run. Moreover, by illustrating the pitfalls and potential bottlenecks in the hospital system, a provider of services that changes any bed in any unit into a multipurpose bed capable of receiving services traditionally associated with another care unit, can more easily sell their product. For example, OpenNet®, from Vitalcom, Inc., uses wireless technology to capture patient information from any manufacturers devices located throughout the healthcare enterprise. In this manner, patient information is distributed in real-time to wherever it is needed, including, but not limited to, nursing stations, physician offices or remote locations. With OpenNet® technology or other such technology, any bed can become a monitored bed, allowing a person in one care unit to be monitored by the staff of another care unit. Therefore, OpenNet® can aid in decreasing costly patient flow problems by reducing bottlenecks by allowing hospitals the ability to transfer patients to another care unit and still monitor them in the transferor care unit as if they were in that care unit. In this way, beds can open up to those that need to be transferred to that care unit. Thus, the flow connecting each care unit to each other is given greater flexibility, and the flow of patients as a whole is increased. Basically, the hospital becomes more efficient. Alternatively, any bed in one care unit can be monitored by another care unit's staff and thus there would be no need to transfer that patient unless necessary, or monitors (that are not traditionally kept in one care unit) can be imported from another care unit and connected to the patient's equipment.

Alternatively, as in step F of FIG. 1, the model can be populated with real-time data from the hospital. This data can be acquired from a hospital database such as an ADTS (Admission Discharge Transmission System), or a point of care system, or a patient locator system.

Generally, patient locator systems monitor the location of patients within a hospital by various wireless techniques. Any of a variety of object/patient location-tracking methods may be used within the system to track the locations of the devices or patients. One such technique is described in U.S. provisional appl. No. 60/193,655, filed Mar. 31, 2000, the disclosure of which is hereby incorporated by reference. With this method, chirpers are positioned throughout the regions of the medical facility in which location-tracking functionality is desired. The chirpers periodically transmit unique ID signals at predetermined signal strengths. These signals are received by nearby location-tracking devices that are attached to the objects to be tracked. The location-tracking devices retransmit the ID signals they receive (preferably in an ISM band) along with a corresponding received signal strength indicator (RSSI). The retransmitted ID and RSSI data is received by nearby location-tracking modules, which forward such data to a location tracking server. The location tracking server uses the combination of chirper IDs and RSSI values it receives from a given location tracking device at a given point in time to determine the device's current location. Other location tracking methods and architectures that may be used include those described in the U.S. Pat. No. 5,944,659, assigned to VitalCom Inc., the disclosure of which is hereby incorporated by reference. Also, U.S. provisional application No. 60/193,650, filed Mar. 31, 2000, the disclosure of which is hereby incorporated by reference, discloses another patient locator method. GPS-based system may also be used for this purpose. Regardless of the particular tracking method used, the near-real time location information for the tracked objects is preferably stored by the location-tracking server and is made available on the network.

Furthermore, the model could be automatically built or programmed based upon collected data. For instance, once data spanning several days or weeks is entered into the model or collected by the model after hospital observation, the model can generate all the statistics and information regarding transfers etc. needed to build the model.

After the real-time data is inputted into the model, the progress of patients can be tracked, much like in an animated manner such that the throughput of patients and cost accrued by each unit is visible. In this embodiment, alarms can be set up to alert hospital staff of impending bottleneck situations. Therefore, patients could be moved around between units before the units actually became overloaded.

Alternatively, the model can be populated with real-time hospital data from the last days, or months or years. Then, the model can replay the events in chronological order and identify bottlenecks that occurred in the past, previous resource under-utilization and other potential faults that occurred in the hospital flow system.

Additionally, affiliated hospitals can be linked together with remote monitoring systems such as SiteLink® from Vitalcom, Inc. With such technology, the patient information is available for review by caregivers throughout the enterprise, including at the remote or affiliate site. With SiteLink®, caregivers can check a patient's real-time status at any location along the network. Additionally, PatientNet® integrates patient data from any manufacturers' device into the SiteLink® network. Thus, the model can be used to analyze the hospitals in total. In this way, affiliated hospitals can better determine how to response to demands on its collective resources. Such capabilities could be utilized to transfer patients between the affiliated hospitals in order to better utilize the hospitals' collective resources.

Alternatively, the real-time model can be supplemented with hypothetical additional admissions and the effect additional admissions would have on the hospital can be predicted.

Figure 5:
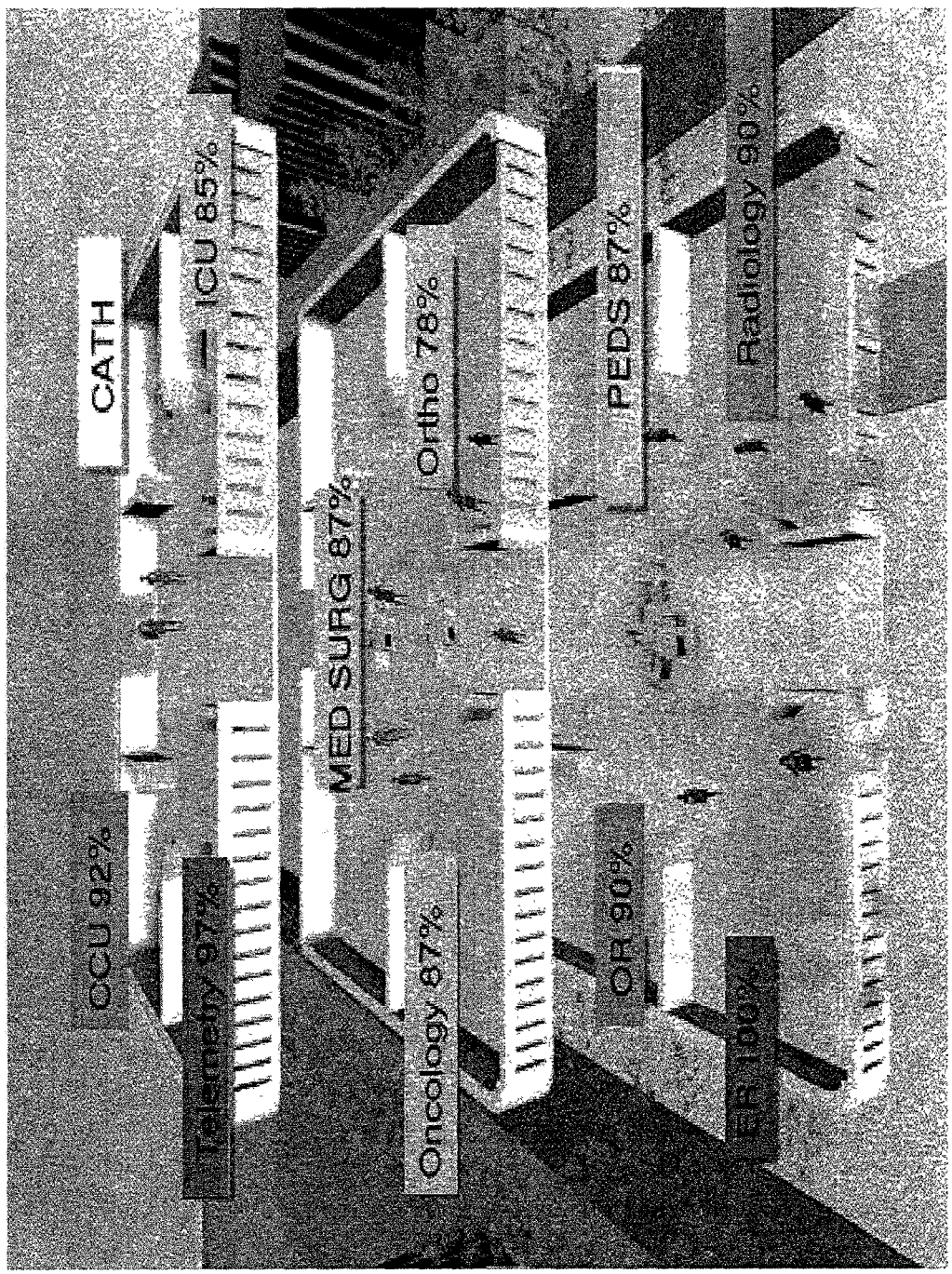
FIG. 5 is a snap shot of a patient flow as viewed by care units produced by a patient flow modeling program in accordance with an embodiment of the present invention.

Regardless of whether the model is run using real-time, past, or hypothetical data, various status reports can be generated by the modeling program. FIG. 5 is a snap shot of the patient flow output as viewed by care unit of a patient flow modeling program in accordance with an embodiment of the present invention. In FIG. 5, each care unit is assigned a percentage that reflects how full the care unit is. Other statistics, such as resource utilization or average wait time in care unit, etc. can be displayed as well.

Figure 6:
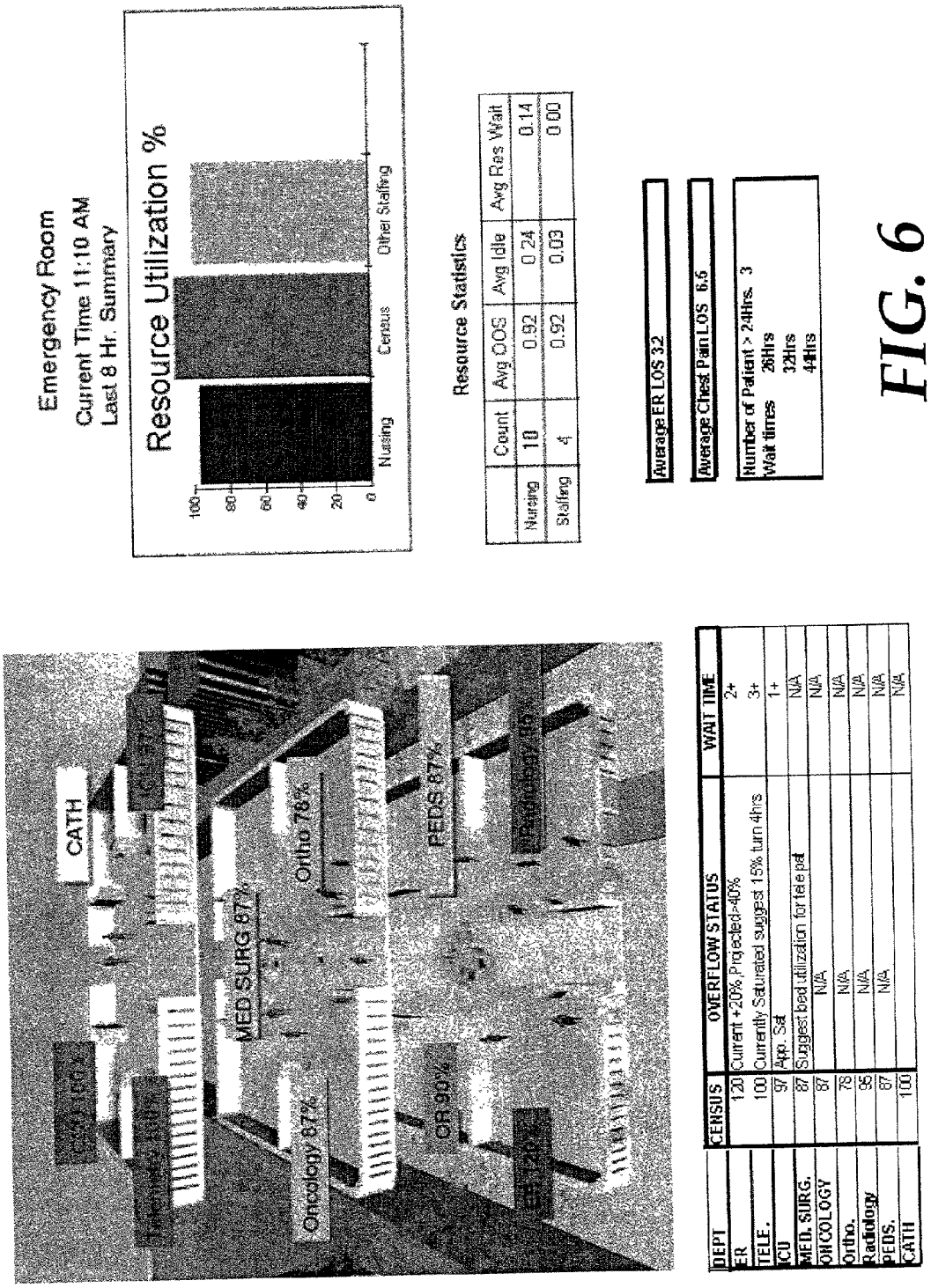
FIG. 6 is a snap shot of a real-time status report including resource statistics of patient flow and resource utilization of a patient flow modeling program in accordance with an embodiment of the present invention.

FIG. 6 is a snap shot of a real-time status report including resource statistics of patient flow and resource utilization of a patient flow modeling program in accordance with an embodiment of the present invention. FIG. 6 illustrates a summary of the current and recent statistics for each care unit and the hospital as a whole. The overflow status of each care unit is displayed, including the current overflow, projected overflow based upon the model and suggested course of actions. The suggested course of action can be to add beds or other healthcare resources. The model can also suggest which patients to move based upon their acuity (for example, by using the Van Slyke system) and other factors, which are well known in the art. The model can also track the resource utilization of staff including nurses, doctors and other healthcare staff. This can be accomplished by tracking nurses responses to patient care pages.

FIG. 7 is a patient monitoring census report. FIG. 7 illustrates the statistics for each patient in the hospital. The model can use these statistics and information to predict when to discharge or transfer a patient to another care unit.

FIG. 8A-C are cost analysis charts produced by the patient flow modeling program in accordance with an embodiment of the present invention. FIG. 8A-C display the various costs associated with a patient stay in a hospital and specifically, in a care unit.

FIG. 9A-C are resource utilization charts produced by the patient flow modeling program in accordance with an embodiment of the present invention.

FIG. 10A-B are resource statistic charts produced by the patient flow modeling program in accordance with an embodiment of the present invention.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Further, the various features of this invention can be used alone, or in combination with other features of this invention other than as expressly described above.

Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. Similarly, the various databases and conversion modules, as well as other known equivalents for each such feature, can be mixed and matched by one of ordinary skill in this art to construct order fulfillment systems in accordance with principles of the present invention.

Thus, it is intended that the scope of the present invention herein disclosed should not be limited by the particular disclosed embodiments described above, but should be determined only by a fair reading of the claims that follow.

What is claimed is:

1. A method of assessing patient flow through care units of a hospital using a computer having a microprocessor comprising:

electronically collecting a set of hospital data for each care unit of a hospital, the set of hospital data including;

a set of hospital statistics, wherein the set of hospital statistics includes inventory of beds and monitored beds, average occupancy of each unit average patient length of stay, number of health care personnel, health care personnel to patient ratio, patient acuity range patient transports, admission sources and frequency, and discharge sources and frequency and a set of hospital macro data, wherein the set of hospital macro data includes average number of admissions, source of admissions frequency of admittance, average number of discharges, frequency of discharge, average overall stay in hospital average number of emergency department visits and percentage visits and percentage admitted, average occupancy and length of stay and average cost per admission;

electronically assigning an hourly cost to each care unit per patient including costs associated with doctor time, nurse time staffing drugs, IV and equipment based upon the set of collected hospital data:

electronically building a model based upon the collected set of hospital data and the assigned hourly cost for each care patient wherein building a model includes building a multi-level model of the hospital care units, describing each unit in terms of numbers of monitored beds and other resources and average length of stay, and further describing each care unit by the percentage of patients going to other care units;

simulating the flow of patients through the hospital using the model, wherein the simulating step utilizes the collected set of hospital data for each care unit per patient by at an admission start, describing the number of patients to be admitted per unit time and the length of time to run the model; and changes recommending hospital resource changes using the model and the results of the simulating step.

2. The method of claim 1, wherein each care unit is a hospital department.

3. The method of claim 1, further comprising using the model to estimate a cost savings that results from a purchase of patient monitoring equipment.

4. The method of claim 1, further comprising identifying a bottleneck in the flow of patients through the hospital.

5. The method of claim 1, wherein collecting data further comprises locating patients through a patient locating system.

6. The method of claim 1, wherein collecting data is done in real-time.

7. The method of claim 6, wherein collecting real-time data comprises using a patient locating system.

8. The method of claim 6, wherein collecting real-time data comprises using an equipment locating system.

9. The method of claim 6, wherein collecting real-time data comprises using an Admission Discharge Transmission System.

10. The method of claim 6, wherein collecting real-time data comprises using a point of care system.

11. The method of claim 1, further comprising predicting a bottleneck in the flow of patients through the hospital through the use of the model.

12. The method of claim 1, wherein the set of collected hospital data comprises data regarding average patient length of stay in a care unit.

13. The method of claim 1, further comprising determining alternative patient flow routes based upon optimizing efficiency of the hospital.

14. The method of claim 1, further comprising determining resource utilization based upon the model.

15. A computer implemented system for modeling patient flow through care units of a hospital comprising:

a collection module configured to accept a set of hospital data, the set of hospital data including a set of hospital statistics, wherein the set of hospital statistics includes inventory of beds and monitored beds, average occupancy of each unit average patient length of stay, number of health care personnel, health care personnel to patient ratio:

patient acuity range, patient transports, admission sources and frequency, and discharge sources and frequency and a set of hospital macro data wherein the set of hospital macro data includes average number of admissions source of admission frequency of admittance, average number of discharges, frequency of discharge average overall stay in hospital average number of emergency patient visits and percentage admitted, average and length of stay, and average cost per admission;

an assignment module configured to assign an hourly cost to each unit per patient for patient including costs associated with doctor time, nurse time staffing, drugs, IV, and equipment based upon the set of collected hospital data;

a model module configured to build a model of the flow of patients through the hospital, the model based upon the set of collected hospital data and the assigned hourly cost for each care unit per patient wherein building a model includes building a multi\-level model of the hospital care units, describing each unit in terms of numbers of monitored beds and other resources and average length of stay, and further describing each care unit by the percentage of patients going to other care units;

a simulation module configured to simulate the flow of patients through the hospital, wherein the simulation module utilizes the set of hospital data for each care unit per patient by, at an admission start~describing the number of patients to be admitted per unit time and the length of time to run the model; and a resource module configured to determine a resource utilization of the hospital by utilizing the model and the output of the simulation module.

16. The system of claim 15, further comprising an estimation module configured to estimate a cost savings that would result from a purchase of patient monitoring equipment.

17. The system of claim 15, further comprising a prediction module configured to predict a bottleneck in the flow of patients.

18. The system of claim 15, further comprising an identification module configured to identify a bottleneck in the flow of patients.

19. The system of claim 15, wherein the collection module is further configured to collect real-time hospital statistics.

20. The system of claim 15, wherein the care units include at least the following hospital departments: Admitting, Intensive Care Unit, Surgery and Discharge.

* * * * *